United States Patent [19]
Furlani

[11] Patent Number: 6,055,529
[45] Date of Patent: Apr. 25, 2000

[54] METHOD, APPARATUS AND COMPUTER PROGRAM PRODUCT FOR EXTRACTING KNOWN PATTERNS FROM A DATA STRUCTURE IN A SINGLE PASS

[75] Inventor: John L. Furlani, Palo Alto, Calif.

[73] Assignee: Sun Microsystems, Inc., Mountain View, Calif.

[21] Appl. No.: 09/026,969

[22] Filed: Feb. 20, 1998

[51] Int. Cl.[7] .................................................. G06F 17/30
[52] U.S. Cl. ................................... 707/3; 707/6; 707/102
[58] Field of Search ................................... 707/3, 6, 102

[56] References Cited

U.S. PATENT DOCUMENTS

| | | | |
|---|---|---|---|
| 4,794,528 | 12/1988 | Hirose et al. | 707/6 |
| 5,809,499 | 9/1998 | Wong et al. | 707/6 |
| 5,873,081 | 2/1999 | Harel | 707/3 |

OTHER PUBLICATIONS

Knuth, D.E., "Sorting and Searching", Chapter Six, in *The Art of Computer Programming*, Addison–Wesley Publishing Company, Menlo Park, California, pp. 389–569 (1973).

*Primary Examiner*—Hosain T. Alam
*Assistant Examiner*—William Trinh
*Attorney, Agent, or Firm*—Sabath & Truong; Robert P. Sabath; Daniel B. Curtis

[57] ABSTRACT

Apparatus, methods and computer program products provide for searching a data structure to extract possible matches of one or more known patterns that may exist in the data structure through a single traversal of the data structure. The apparatus methods and computer program products use a direction list tree that represents the known patterns that may exist in the data structure. The apparatus, methods and computer program products detect known patterns by gathering marker information from edge nodes that define the known patterns and then, at each pattern termination node, determines which known patterns have been found. These known patterns can then be processed.

21 Claims, 8 Drawing Sheets

570

580

METHOD, APPARATUS AND COMPUTER PROGRAM PRODUCT FOR EXTRACTING KNOWN PATTERNS FROM A DATA STRUCTURE IN A SINGLE PASS

BACKGROUND OF THE INVENTION

1. Field of the Invention

This invention relates to the field of computer processing. Specifically, this invention is a method, apparatus and computer program product for searching a data structure to extract possible matches of a one or more known patterns that may exist in the data structure through a single traversal of the data structure.

2. Background

Many computer programs use data structures. The structure and contents of these data structures often contain patterns. The patterns can be of text, a series of operations, or other construct that can be represented by a data structure. Many computer processes need to search the data structure for known patterns. Many prior art techniques for searching data structures are described in *The Art of Computer Programming,* vol. 3, chapter 6, by Donald E. Knuth, © 1993 Addison-Wesley Publishing Co., ISBN 0-201-03803-X.

An example, non-limiting, use of data structures is provided by graphical imaging systems that allow deferred operations. Thus, as an application program invokes graphical operations on images, the operations are captured and stored in a data structure. This process continues until an operation is invoked that requires the generation of an actual image (such as a display or print operation). Once the generation operation is detected, the operations stored in the data structure are invoked to generate the actual image. The operations stored in the data structure are "atomic" operations in that they each perform a specific operation on one or more input images and result in a resultant image that can be used by a subsequent operation. One optimization that can be applied to this process is to detect known patterns of atomic operations that can be replaced by a molecular operation. A molecular operation operates on the same input images as does the recognized pattern of atomic operations, but is able to generate a resulting image without generating the intermediate images generated by the atomic operations. Thus, the performance of the imaging process is improved by replacing patterns of atomic operations in the data structure by equivalent molecular operations (or by off-loading the molecular operation to hardware). However, searching the data structure for these patterns consumes significant computational resource.

Searching for known patterns in the data structure, prior to the invention, has involved repetitive searches of the data structure—one search for each possible pattern until a pattern is matched. Each search consumes computer resources. Thus, multiple searches of the data structure for the known patterns are inefficient and decrease the performance of computers that perform such searches. A more efficient pattern search mechanism would improve the performance of such a computer. Thus, it would be advantageous to detect previously known patterns that exist within a data structure though a single search of the data structure.

SUMMARY OF THE INVENTION

The present invention improves the performance of computers that search data structures for known patterns by providing a mechanism to locate a plurality of known patterns in the data structure from a single traversal of the data structure.

One aspect of the invention is a computer controlled method for searching a data structure to extract possible matches of one or more known patterns that may exist in the data structure. The method includes the step of constructing the data structure. The data structure has a starting node and one or more dependent nodes linked to the starting node. The method also matches the starting node with a first base leaf contained within a direction list. The direction list includes a plurality of tnodes one of which is the first base leaf. The direction list also represents the one or more known patterns that are each capable of being represented within the data structure. Each of the one or more known patterns shares the first base leaf within the direction list. The method also includes the step of searching the data structure from the starting node for the one or more known patterns in the direction list by performing a single traversal of the direction list. The single traversal corresponds to the dependent nodes. The method also accumulates one or more patterns dependent on the searching step.

Another aspect of the invention is an apparatus, having a central processing unit (CPU) and a memory coupled to said CPU, for searching a data structure in the memory to extract possible matches of one or more known patterns that may exist in the data structure. The apparatus includes a data structure construction mechanism that is configured to build the data structure in the memory. The data structure has a starting node and one or more dependent nodes linked to the starting node. The apparatus also comprises a base-leaf matching mechanism that is configured to match the starting node of the data structure with a first base leaf contained within a direction list. The direction list includes a plurality of tnodes one of which is the first base leaf. The direction list also represents the one or more known patterns that are each capable of being represented within the data structure. Each of the one or more known patterns shares the first base leaf within the direction list. In addition, the apparatus includes a pattern search mechanism that is configured to search the data structure from the starting node for the one or more known patterns in the direction list. The pattern search mechanism performs this function by a single traversal of the direction list corresponding to the dependent nodes. The located patterns are accumulated by a pattern accumulation mechanism that is configured to accumulate one or more patterns dependent on the pattern search mechanism.

Yet a further aspect of the invention is a computer program product embedded on a computer usable medium for causing a computer to search a data structure in a memory to extract possible matches of one or more known patterns that may exist in the data structure. When executed on a computer, the computer readable code causes a computer to effect a data structure construction mechanism, a base-leaf matching mechanism, a pattern search mechanism and a pattern accumulation mechanism. Each of these mechanisms has the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1:
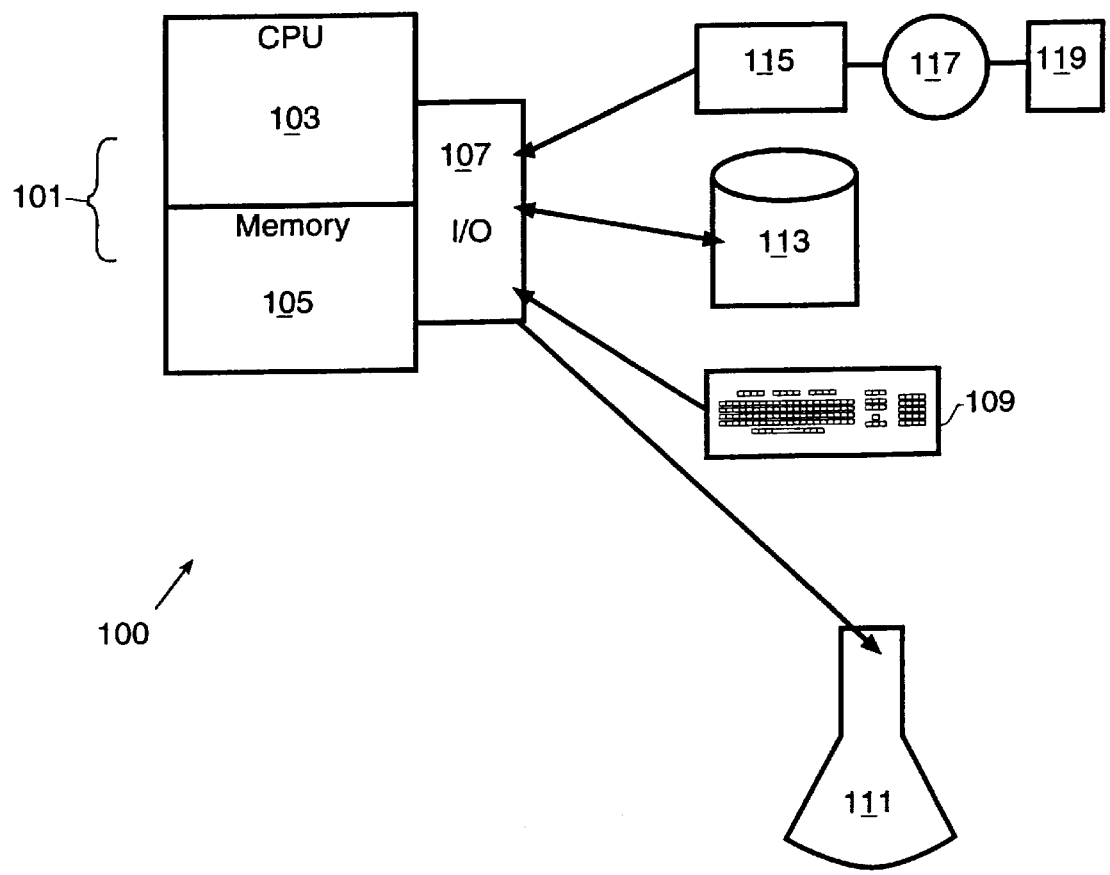
FIG. 1 illustrates a computer system capable of using the invention in accordance with a preferred embodiment.

The following 'notations and nomenclature' are provided to assist in the understanding of the present invention and the preferred embodiments thereof.

Atomic operation, Molecular operation—One skilled in the art will understand that the terms "atomic" and "molecular" do not refer to atoms or molecules; nor are they related to nuclear or chemical processes. Rather these terms refer to operations that can be performed by a computer. In particular, in a graphical imaging embodiment, an "atomic" operation generates an image result (often by manipulating an image input) while a "molecular" operation performs a series of manipulations (each of which could be represented as an atomic operation) to generate an image result. The molecular operations are more efficient than the separate atomic operations.

Data Structure—A data structure is an ordered arrangement of storage in memory for variables.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

One skilled in the art will understand that although the following description of the invention is cast within a procedural programming paradigm, the techniques disclosed are applicable to an object oriented paradigm.

The invention is described within the context of a graphical imaging application. One skilled in the art will understand that the invention is not limited to such an application and that the invention can be used whenever the need exists to search a data structure for known patterns within the data structure.

The invention is illustrated by its use in the previously described graphical imaging system that supports deferred operations. An application program generates a data structure representing deferred operations on images until an image generation operation is detected. Once the image generation operation is detected, the invention searches the data structure for known patterns in the "atomic" operations that represent known "molecular" operations. Within such a graphical imaging application, the invention improves the efficiency of detecting a pattern of atomic operations so that the atomic operations can be replaced by a molecular operation. One skilled in the art will understand that similar pattern recognition needs also exist for applications other than image processing.

The invention uses a computer. Some of the elements of a computer, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 11, a disk storage unit 113 and a CD-ROM drive unit 115. The CD-ROM drive unit 115 can read a CD-ROM medium 117 that typically contains a program and data 119. The CD-ROM drive unit 115, along with the CD-ROM medium 117, and the disk storage unit 113 comprise a filestorage mechanism. Such a computer system is capable of executing applications that embody the invention. One skilled in the art will understand that the CD-ROM drive unit 115 can be replaced by some other device that allows computer readable code to be read into the computer from some media, or over the network. Such a person will also understand that the invention can be practiced on a computer that does not include a keyboard or display.

Figure 2:
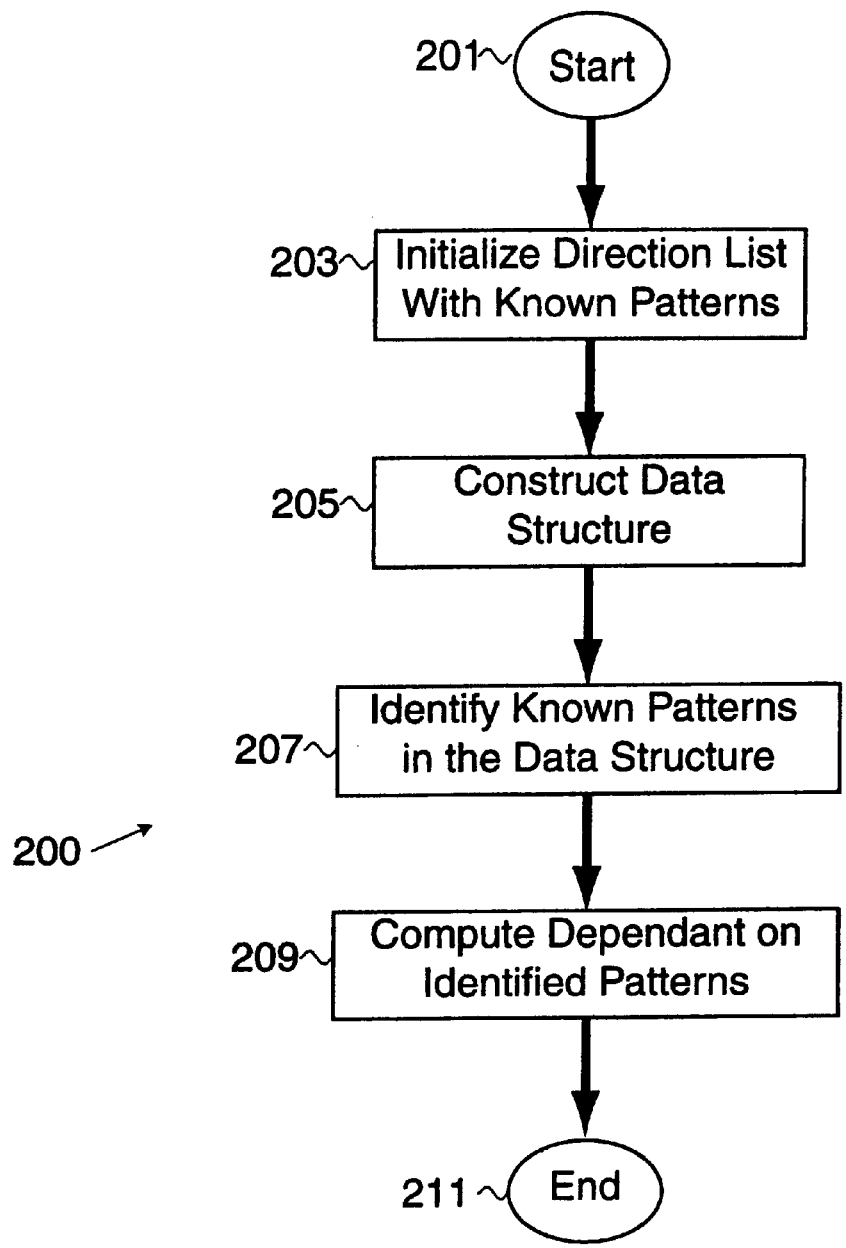
FIG. 2 illustrates a use of the invention in accordance with a preferred embodiment.

FIG. 2 illustrates a pattern identification process, indicated by general reference character 200, for identifying and processing a known pattern within a data structure. The pattern identification process 200 initiates at a 'start' terminal 201 and continues to a 'direction list initialization' procedure 203. The 'direction list initialization' procedure 203 constructs a direction list in memory. Encoded within the direction list are previously known patterns that can exist in the data structure. The direction list is subsequently described with respect to FIG. 4 and FIG. 5. Next the pattern identification process 200 continues to a 'construct data structure' procedure 205 that builds a data structure (such as a directed acyclic graph (DAG)) that may contain one or more of the known patterns. One skilled in the art will understand how to create data structure construction mechanism that can build such a data structure. Once the data structure is constructed, the pattern identification process 200 continues to an 'identify patterns' procedure 207 that performs a single traversal of the direction list to determine whether the data structure contains any of the known patterns that were encoded within the direction list. The 'identify patterns' procedure 207 is subsequently described with respect to FIG. 6 and FIG. 7. Next, the pattern identification process 200 continues to a 'compute dependent on identified patterns' procedure 209 that performs computations that are dependent on which known patterns were found by the 'identify patterns' procedure 207. The pattern identification process 200 completes through an 'end' terminal 211.

In the image processing embodiment, the 'compute dependent on identified patterns' procedure 209 replaces the atomic operations that form an identified pattern with the corresponding molecular operation to increase the efficiency of the deferred image processing efficiency. One skilled in the art will understand that other embodiments will perform appropriate computations based on the patterns identified within the data structure.

Figure 3:
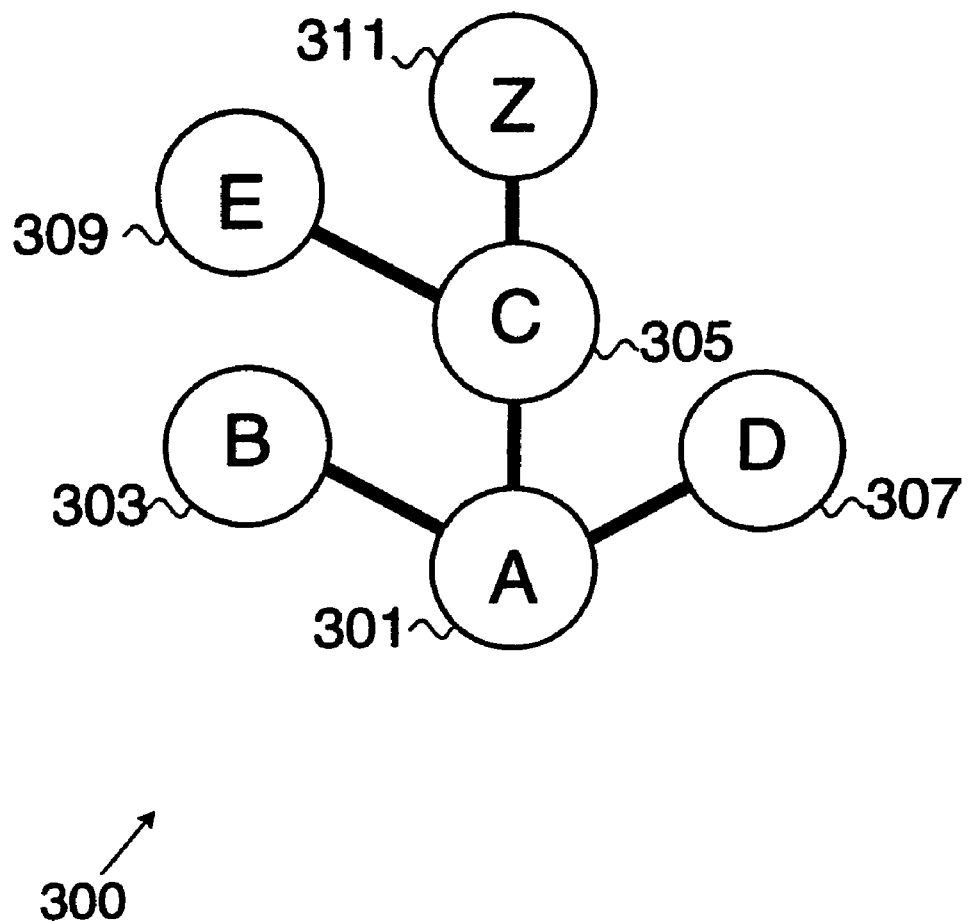
FIG. 3 illustrates a graphical representation of a prior art data structure that contains patterns that can be detected by a preferred embodiment.

FIG. 3 illustrates a prior art data structure, indicated by general reference character 300, that could be created by the 'construct data structure' procedure 205. The prior art data structure 300 can be a DAG, a tree, or other data representations known to one skilled in the art. The prior art data structure 300 includes an 'A' node 301, a 'B' node 303, a 'C' node 305, a 'D' node 307, an 'E' node 309, and a 'Z' node 311. The 'A' node 301 serves as a starting node for the prior art data structure 300. The other nodes 303, 305, 307, 309, 311 are dependent nodes of the 'A' node 301. One skilled in the art will understand that the 'C' node 305 can also serve as a starting node having dependent nodes 309, 311. One skilled in the art will also understand that the prior art data structure 300 contains patterns of nodes that are defined by the placement and dependencies of the nodes.

The syntax rules we use for describing patterns are:
  Parent nodes are separated from their dependent nodes by parentheses (for example, "A(B)" indicates that node "A" is the parent of dependent node "B").
  Multiple nodes, that are dependent on the same parent node, are separated by a comma "," and listed corresponding to the order they are accessed. For example, the pattern "A(B,C)" indicates that both "B" and "C" are dependent nodes of "A" and that "B" is accessed prior to "C". The prior art data structure 300 is represented by A(B, C(E, Z), D).

FIG. 3 produces a number of patterns. For example, one pattern is A(B); other patterns include A(B, C, D); C(E, Z); A(B, C(E, Z), D); and A(B, C(E)). The prior art data structure 300 can be a DAG used to represent dependencies within a computer program (often used by a compiler), a DAG used to represent a series of image operations on one or more images, or many other classes of data structures used for computational purposes. One skilled in the art will also understand that the nodes in the DAG can represent atomic image processing operations and that the known patterns within the DAG can represent molecular image processing operations.

Figure 4:
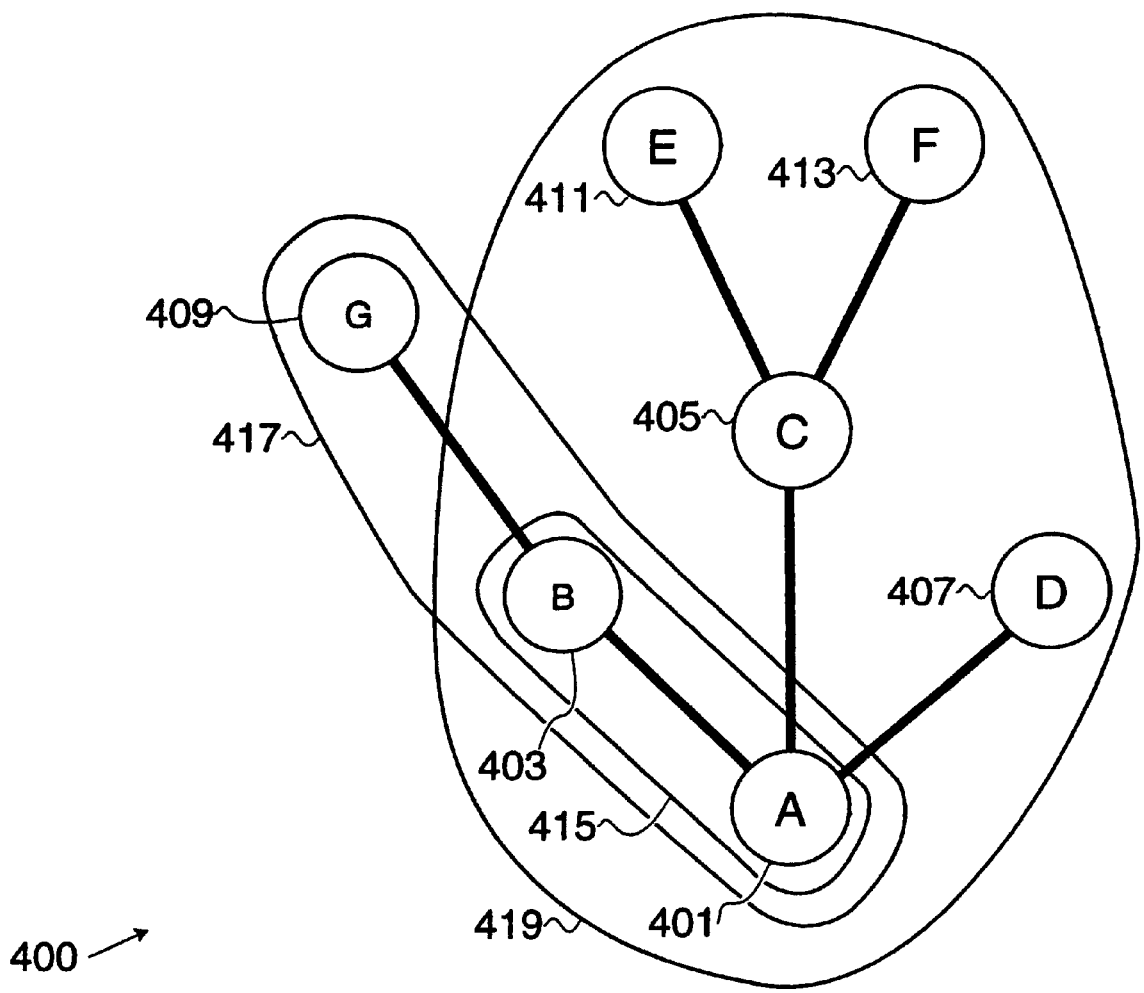
FIG. 4 illustrates a graphical representation of a direction list in accordance with a preferred embodiment.

FIG. 4 illustrates a direction list tree, indicated by general reference character 400, used to represent known patterns that can occur in the prior art data structure 300. The direction list tree 400 is composed of "tree nodes" (tnodes) and includes an 'A' tnode 401, a 'B' tnode 403, a 'C' tnode 405, a 'D' tnode 407, a 'G' tnode 409, an 'E' tnode 411, and an 'F' tnode 413. Each tnode 401, 403, 405, 407, 409, 411, 413 represents a node that may exist within the prior art data structure 300. The 'A' tnode 401 and the 'B' tnode 403 comprise an 'A(B)' pattern 415. The 'A' tnode 401, the 'B' tnode 403 and the 'G' tnode 409 comprise an 'A(B(G))' pattern 417. The 'A' tnode 401, the 'B' tnode 403, the 'C' tnode 405, the 'D' tnode 407, the 'E' tnode 411 and the 'F' tnode 413 comprise an 'A(B, C(E, F), D)' pattern 419. One skilled in the art will understand that other patterns could be recognized in the direction list tree 400. The direction list tree 400 contains additional information that is used to identify the known patterns defined within the direction list tree 400 as is subsequently described with respect to FIG. 5A. Each known pattern starts with a base leaf. The base leaf for the direction list tree 400 is the 'A' tnode 401. Each of the known patterns has an interrelationship within the tnodes that make up the direction list tree 400. The known patterns share tnodes where appropriate. For example, the 'A(B)' pattern 415 shares the 'A' tnode 401 and the 'B' tnode 403 with the 'A(B, C(E, F), D)' pattern 419 and the 'A(B(G))' pattern 417 but the 'A(B, C(E, F), D)' pattern 419 does not share the 'G' tnode 409 with the 'A(B(G))' pattern 417. Thus, one skilled in the art will understand that the direction list tree 400 contains tnodes that contain pattern information. The direction list is traversed in accordance with the structure of the nodes in the data structure so that only the tnodes that correspond to nodes in the data structure are traversed. In addition, although the direction list tree 400 can contain additional possible patterns, such as 'A(D)' or 'A', these additional patterns may not be useful.

Figure 5A:
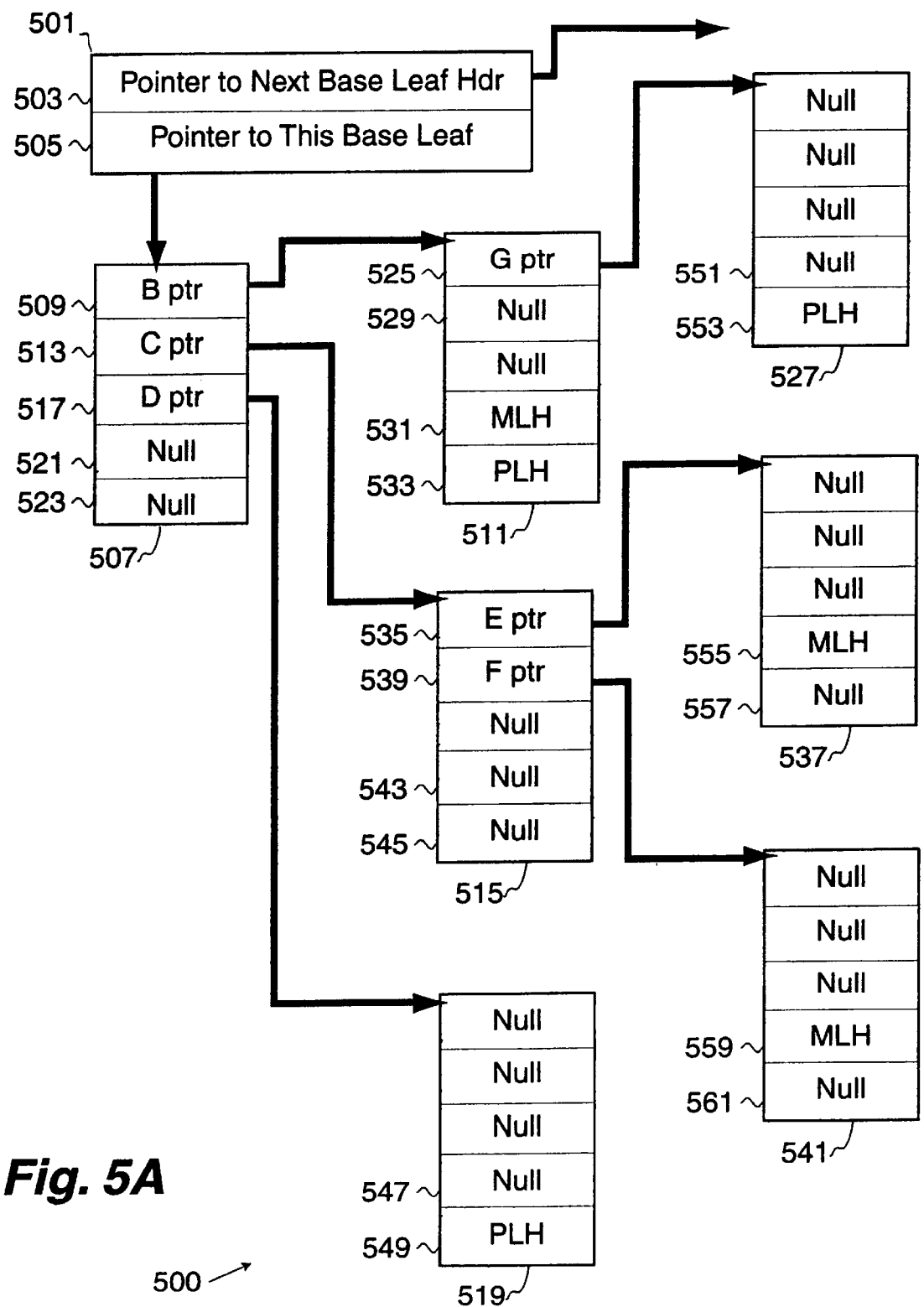
FIG. 5A illustrates a direction list tree in accordance with a preferred embodiment.

FIG. 5A illustrates a direction list tree structure, indicated by general reference character 500, that corresponds to the direction list tree 400 (illustrated in FIG. 4) representing the: 'A(B)' pattern 415; 'A(B(G))' pattern 417; and 'A(B, C(E, F), D)' pattern 419. One skilled in the art will understand that the fixed size tnodes, illustrated by FIG. 5A, represent but one preferred embodiment. Other embodiments may use a list to store pointers to dependent tnodes. Each of the tnodes in FIG. 5A is capable of storing pointers to three dependent tnodes along with other subsequently described information.

A 'base leaf' header 501 contains a 'next base leaf header' pointer 503 and a 'base leaf' pointer 505. The 'base leaf' header 501 is part of a list, array, bag, collection or similar structure that provides access to the base leaf for each of the known patterns. The 'base leaf' pointer 505 points to a 'base leaf' tnode 507. In this example, the 'base leaf' tnode 507 corresponds to an 'A' tnode. Thus, if the 'A' node 301 is the starting node in the prior art data structure 300 the invention would find the base leaf tnode that corresponded to the 'A' node 301—in this case the 'base leaf' tnode 507 using a base-leaf matching mechanism. However, if the starting node in the prior art data structure 300 was the 'C' node 305, the 'base leaf' tnode 507 could not be used as the base leaf as the node and the tnode do not match. Instead, other 'base leaf' headers in the collection structure would be searched to find a match.

The 'base leaf' tnode 507 is the source of a tree of tnodes and includes a 'B tnode' pointer 509 that points to a 'B' tnode 511. The 'base leaf' tnode 507 also includes a 'C tnode' pointer 513 that points to a 'C' tnode 515 and a 'D tnode' pointer 517 that points to a 'D' tnode 519. These dependent tnodes correspond to the respective tnodes illustrated in FIG. 4. One skilled in the art will understand that fixed length pointer arrays in a data structure is not a limitation to the invention, but rather is one of many possible implementations that can be used to store this information. The 'base leaf' tnode 507 also includes storage for a 'marker list' header 521 (MLH) and a 'pattern list' header 523 (PLH) that can be used as is subsequently described with respect to FIG. 5B and FIG. 5C. The 'base leaf' tnode 507 contains NULL pointers in this storage because, in this example, a solitary "A" node is not a recognized pattern.

The 'B' tnode 511 includes a 'G tnode' pointer 525 to a 'G' tnode 527 and a 'NULL' pointer 529. The 'NULL' pointer 529 indicates that the 'B' tnode 511 does not point to a tnode for the second of the possible tnode pointers. The 'NULL' pointer in the third tnode pointer in the 'B' tnode 511 also shows that there is no associated tnode. The 'B' tnode 511 also includes storage for a 'marker list' header 531 and a 'pattern list' header 533 that are subsequently described. Thus, the 'B' tnode 511 is both an edge node and a termination node.

The 'C' tnode 515 includes an 'E tnode' pointer 535 that points to an 'E' tnode 537 and an 'F tnode' pointer 539 that points to an 'F' tnode 541. The 'C' tnode 515 also includes storage for a 'marker list' header 543 and a 'pattern list' header 545 that contain NULL pointers.

The 'D' tnode 519 includes storage for a 'marker list' header 547 (which contains a NULL pointer) and a 'pattern list' header 549 that is subsequently described. The 'D' tnode 519 contains NULL pointers in the dependent tnode storage to indicate that no dependent tnodes depend from the 'D' tnode 519.

The 'G' tnode 527 has no dependent tnodes. Thus, the storage for the tnode pointers contains NULL pointers. As will be subsequently described, because the 'G' tnode 527 is not an edge node, a 'marker list' header 551 contains the NULL pointer. Because the 'G' tnode 527 is a termination node, it contains a 'pattern list' header 553 and not the NULL pointer.

The 'E' tnode 537 also has no dependent tnodes. Thus, the storage for the tnode pointers also contains NULL pointers. As will be subsequently described, because the 'E' tnode 537 is not a termination node and is an edge node, a 'marker list' header 555 contains a marker list pointer and a 'pattern list' header 557 contains the NULL pointer.

The 'F' tnode 541 also has no dependent tnodes so the storage for the tnode pointers contains NULL pointers. As will be subsequently described, because the 'F' tnode 541 is not a termination node and is an edge node, a 'marker list' header 559 contains a marker list pointer and a 'pattern list' header 561 contains the NULL pointer.

One skilled in the art will understand that the 'base leaf' header 501 and the prior art data structure 300 can be recursively traversed in a depth-first manner.

Some of the tnodes in the direction list tree structure 500 are edge nodes. Edge nodes contain non-NULL marker list headers. Thus, the 'B' tnode 511, the 'E' tnode 537, and the 'F' tnode 541 are all edge tnodes. Pattern termination tnodes contain a non-NULL pattern list header. Thus, pattern termination tnodes are the 'B' tnode 511, the 'G' tnode 527, and the 'D' tnode 519. Continuation tnodes are tnodes that have pointers to dependent tnodes. Thus, continuation tnodes are the 'base leaf' tnode 507, the 'B' tnode 511, and the 'C' tnode 515.

Patterns are found in the direction list tree structure 500 by gathering markers from each visited edge tnode. In a preferred embodiment, markers are a unique bit. As markers are gathered (accumulated) into a word of memory, the word takes on a unique value that indicates which markers have been gathered. Finding a marker implies that all the nodes leading to the marked node were traversed. When a pattern termination tnode is encountered, the process determines whether the tnodes required for the pattern have been traversed by comparing the value of the gathered markers with a value that identifies the pattern. The markers identify the interrelationship between the tnodes for each respective pattern. Thus, to detect pattern A(B, C(E, F), D), the search process (subsequently described in detail) gathers markers for this pattern from the 'B' tnode 511, the 'E' tnode 537, and the 'F' tnode 541. In addition, when the search process reaches the 'D' tnode 519 (a pattern termination node) the marker value for the each pattern that terminates on the 'D' tnode 519 is compared with the accumulated marker value. A pattern is found if the accumulated marker value (assembled from the gathered markers) matches an entry on the PLH of the pattern termination node.

One skilled in the art will understand that the markers verify the existence of the underlying tnodes required to reach the edge tnode. Thus, instead of accumulating explicit tnodal interrelationship information the invention accumulates only the result that is required by the explicit tnodal interrelationship.

Both the 'B' tnode 511, the 'G' tnode 527 and the 'D' tnode 519 are pattern termination tnodes. When a pattern termination tnode is encountered, the pattern matching process examines the patterns pointed to by PLH and the accumulated marker value (generated by the gathered markers) to determine whether the required tnodes that comprise the pattern have been traversed. One skilled in the art will understand that the data structure contains the pattern starting from the starting node, if the required tnodes for the pattern have been traversed. If the required markers are not present, the pattern is not complete and is not accumulated. Otherwise the pattern is accumulated by a pattern accumulation mechanism. Thus, assuming that the 'A(B, C(E, F), D)' pattern 419 existed in the scanned data structure, the invention would accumulate both the 'A(B)' pattern 415 and the 'A(B, C(E, F), D)' pattern 419. However, the invention would not accumulate the 'A(B(G))' pattern 417 because the 'G' tnode 409 did not have a corresponding node in the data structure. Thus, the direction list tree structure 500 is used to identify known patterns in the data structure.

Notice that the 'base leaf' tnode 507 that corresponds to the 'A' tnode 401 and the 'B' tnode 511 that corresponds to the 'B' tnode 403 are shared by the 'A(B)' pattern 415, the 'A(B(G))' pattern 417, and the 'A(B, C(E, F), D)' pattern 419. One skilled in the art will understand that the pattern accumulation mechanism of the invention can be used to accumulate known patterns within the data structure. One so skilled will also understand that the invention can be configured to capture the largest pattern, the smallest pattern, or patterns having particular characteristics.

Figure 5B:
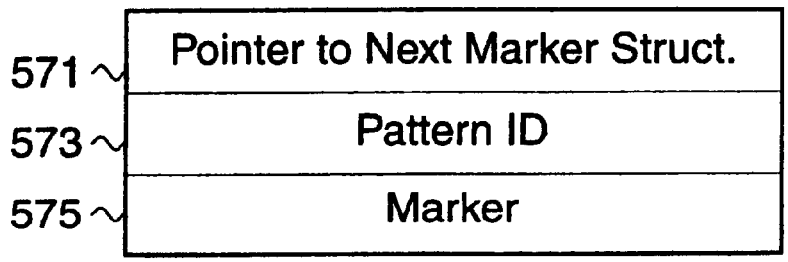
FIG. 5B illustrates marker structure in accordance with a preferred embodiment.

The MLH and PLH point to pattern information within the direction list tree structure 500. FIG. 5B illustrates a marker structure, indicated by general reference character 570, for associating the tnode with particular patterns. The 'next' pointer 571 contains a pointer to the next marker structure (not shown) or is NULL if the marker structure 570 is last in the list. A 'pattern id' storage 573 contains a pattern identifier that associates the value in a 'pattern marker value' storage 575 with the pattern identified by the pattern identifier. The search process (subsequently described with respect to FIG. 6) gathers and accumulates the values in the 'pattern marker value' storage 575 for each pattern identified in the MLH list for each tnode encountered during the search process. One skilled in the art will understand that the markers can be unique for all patterns if the total number of markers can fit within a word and thus simplify the marker list to a single value.

Figure 5C:
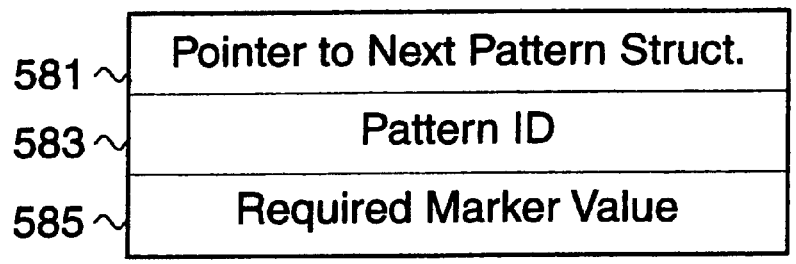
FIG. 5C illustrates a pattern structure in accordance with a preferred embodiment.

FIG. 5C illustrates a pattern structure, indicated by general reference character 580, that indicates that the associated tnode is a pattern termination tnode. The pattern structure 580 includes a 'next' pointer 581 that contains a value that points to the next pointer structure (not shown) or is NULL if the if the pattern structure 580 is the last in the list. A 'pattern id' storage 583 contains a pattern identifier defining a possible pattern match. A 'required marker value' storage 585 contains a unique value that results from combining the markers required for the pattern. Thus, when a pattern termination tnode is reached, the process traverses the pattern list comparing the contents of the 'required marker value' storage 585 with the accumulated markers for each pattern represented in the pattern list. If the value of the accumulated markers matches the value in the 'required marker value' storage 585, the pattern represented by the value stored in the 'pattern id' storage 583 has been matched within the nodes of the data structure. Thus, the termination node can terminate multiple patterns.

A pattern identification mechanism identifies which patterns will be represented by the direction list tree structure 500. This mechanism includes human examination and selection of the possible patterns, computerized pattern categorization techniques or other mechanisms that determine which known patterns are to be included in the direction list tree structure 500.

One skilled in the art will understand (from FIG. 5A, FIG. 5B, and FIG. 5C and the previous description of these figures) how to make a direction list construction mechanism (and/or a direction list creation mechanism) that constructs the direction list in computer memory to represent known patterns that may exist in the data structure. The respective interrelationship between the tnodes in the tree of tnodes, coupled with the pattern information contained in the tnodes' PLH and MLH lists, allow the tnodes to be shared by the patterns defined within the direction list. One skilled in the art will also understand that some embodiments of the invention will not require an exact match with the accumulated marker value and the value in the 'required marker value' storage 585.

Figure 6:
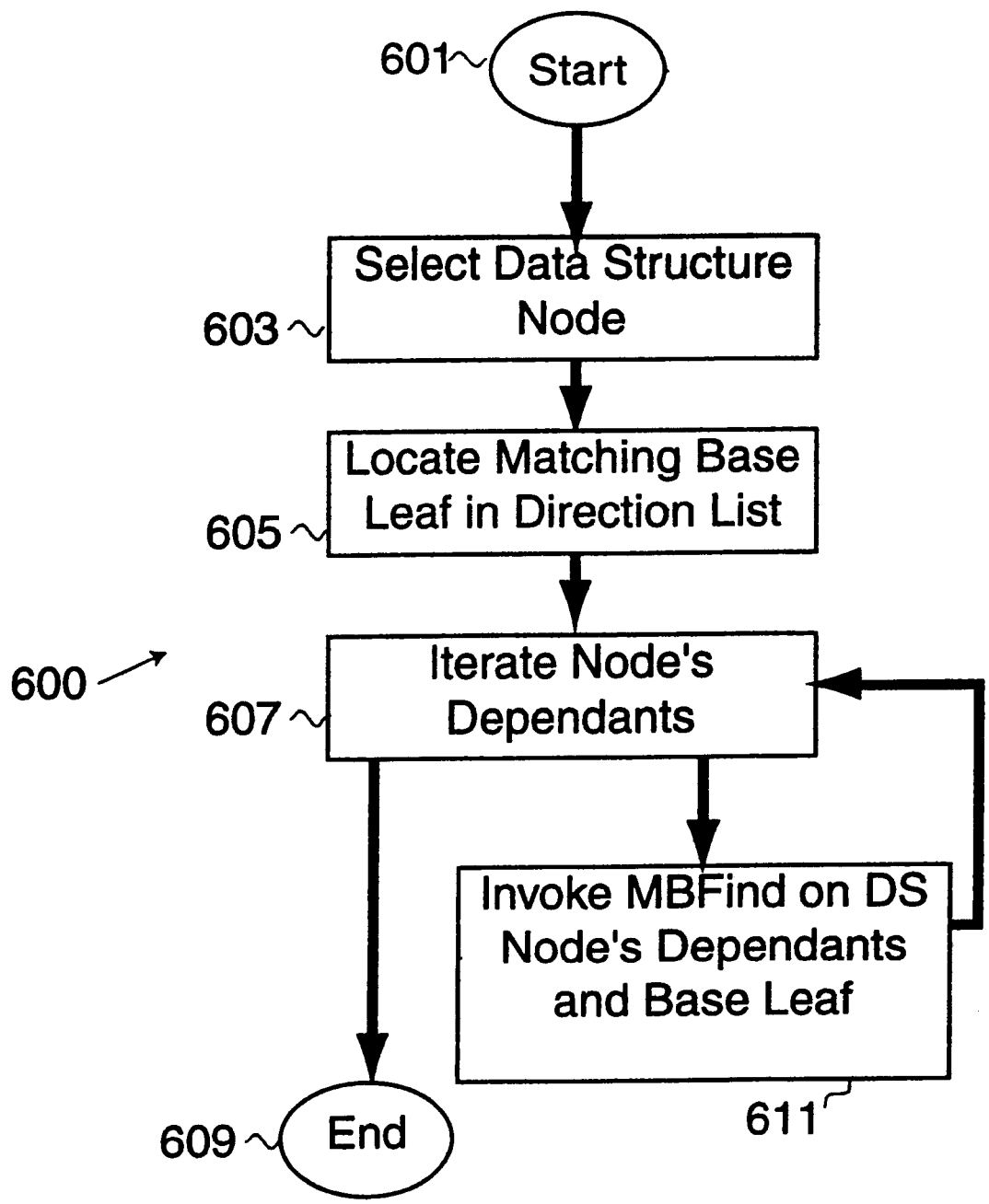
FIG. 6 illustrates the process used to locate patterns within a data structure in accordance with a preferred embodiment.
Figure 7:
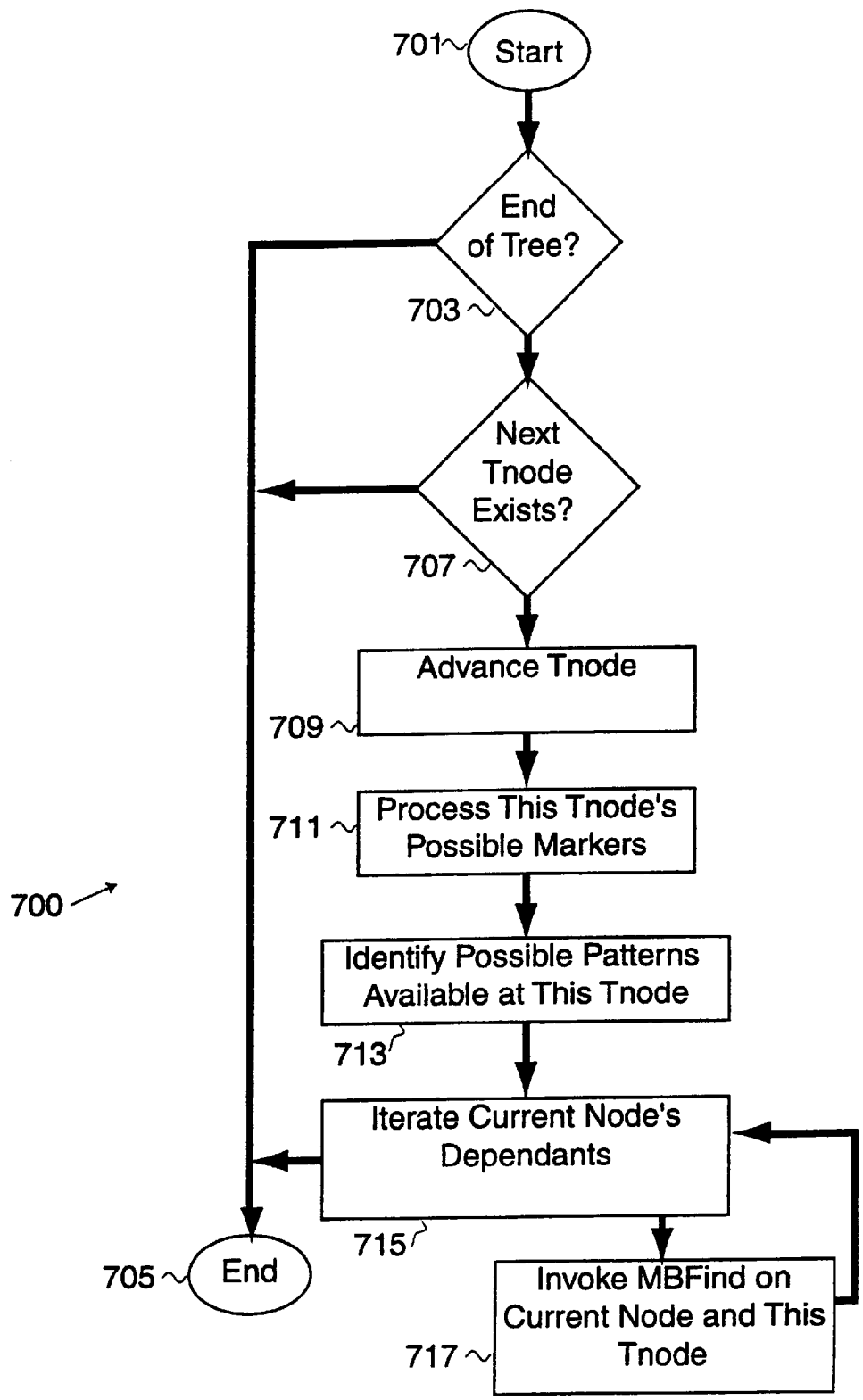
FIG. 7 illustrates the process used recursively traverse the data structure and direction list tree to locate known patterns in the data structure in accordance with a preferred embodiment.

FIG. 6 and FIG. 7 illustrate the processes used within a pattern search mechanism. FIG. 6 illustrates a 'locate patterns' process, indicated by general reference character 600, for identifying known patterns in the data structure where the known patterns are represented by the previously described direction list. The 'locate patterns' process 600 is invoked by the 'identify patterns' procedure 207 of FIG. 2. The 'locate patterns' process 600 initiates at a 'start' terminal 601 and continues to a 'select data structure node' procedure 603. The 'select data structure node' procedure 603 selects a node in the data structure that is the starting node for the pattern search. Next the 'locate patterns' process 600 continues to a 'locate base leaf in direction list tree' procedure 605 that locates a base leaf in the direction list that corresponds to the starting node in the data structure. Then the process continues to an 'iterate dependent nodes' procedure 607 that iterates dependent nodes of the starting node. After all the starting node's dependencies have been iterated the 'locate patterns' process 600 completes though an 'end' terminal 609. Each dependent node iterated by the 'iterate dependent nodes' procedure 607 is processed by an 'invoke MBFind' procedure 611 to recursively continue the pattern search off the starting node. The 'invoke MBFind' procedure 611 is subsequently described with respect to FIG. 7.

FIG. 7 illustrates a 'recursive pattern search (MBFind)' process, indicated by general reference character 700, that performs a single depth-first traversal of the direction list that corresponds to the starting node of the data structure. The 'recursive pattern search (MBFind)' process 700 is initially invoked by the 'invoke MBFind' procedure 611 of FIG. 6 and recursively invokes itself as is subsequently described. The 'recursive pattern search (MBFind)' process 700 initiates at a 'start' terminal 701 and continues to an 'end of tree' decision procedure 703 that determines whether the current branch of the direction list has ended. If the end of the current branch was reached, the 'recursive pattern search (MBFind)' process 700 completes through an 'end' terminal 705.

Otherwise the 'recursive pattern search (MBFind)' process 700 continues to a 'next tnode exists' decision procedure 707 that determines whether the tnode specified at the invocation of the 'recursive pattern search (MBFind)' process 700 exists in the direction list. If the specified tnode does not exist, the 'recursive pattern search (MBFind)' process 700 completes through the 'end' terminal 705. Otherwise the 'recursive pattern search (MBFind)' process 700 advances to an 'advance to next tnode' procedure 709 that selects the tnode corresponding to the specified node in the data structure. Next the 'recursive pattern search (MBFind)' process 700 traverses the marker list in the tnode (if the MLH is not NULL) to gather tnode markers for every pattern that uses the tnode at a 'process tnode markers' procedure 711. The markers for each pattern are accumulated with markers from other tnodes that are associated with the same pattern as the markers are gathered. The accumulated markers will be evaluated at a pattern termination tnode. Once the markers are extracted the 'recursive pattern search (MBFind)' process 700 continues to an 'identify possible patterns' procedure 713 that traverses the pattern list within the pattern termination tnode (if the PLH is not NULL) to match the accumulated pattern markers with the markers required to define a specific pattern. If the accumulated pattern markers match the contents of the 'required marker value' storage 585 the associated pattern is validated. Once the pattern is validated it can be accumulated by a pattern accumulation mechanism. Next, the 'recursive pattern search (MBFind)' process 700 continues to an 'iterate dependent nodes' procedure 715 that iterates all the dependent nodes of the current node to continue searching for other known patterns. When all the dependent nodes have been iterated the 'recursive pattern search (MBFind)' process 700 completes through the 'end' terminal 705. Each iteration produced by the 'iterate dependent nodes' procedure 715 is supplied to a 'recursively invoke MBFind' procedure 717 that traverses the direction list as will be recognized by one skilled in the art.

From the foregoing one skilled in the art will understand that the invention identifies known patterns from within a data structure and provides (without limitation) the following advantages:

1) A single traversal of the direction list identifies known patterns that exist in the data structure thus inefficient multiple searches for known patterns are unnecessary.
2) A compact mechanism for representing the known patterns by marking the edge nodes of the pattern in the direction list makes the invention very efficient.

3) The portion of the direction list that is searched is never greater than is necessary.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for searching a data structure to extract possible matches of one or more known patterns that may exist in said data structure, said method comprising steps of:

(a) building said data structure, said data structure having a starting node and one or more dependent nodes linked to said starting node;

(b) matching said starting node with a first base leaf contained within a direction list, said direction list comprising a plurality of tnodes one of which is said first base leaf, said direction list also representing said one or more known patterns each capable of being represented within said data structure, each of said one or more known patterns sharing said first base leaf within said direction list, the plurality of tnodes including a plurality of tnode markers;

(c) searching said data structure from said starting node for said one or more known patterns in said direction list by performing a single traversal of said direction list, said single traversal corresponding to said dependent nodes; and (d) accumulating one or more patterns dependent on step (c).

2. The computer controlled method of claim 1 further comprising:

(e) constructing said direction list.

3. The computer controlled method of claim 2 wherein step (e) comprises steps of:

(e1) identifying said one or more known patterns; and (e2) creating a first tree of tnodes, extending from said first base leaf representing said one or more known patterns that start from said first base leaf, each of said one or more known patterns represented by a respective interrelationship between said plurality of tnodes, wherein portions of said respective interrelationship that are shared between each of said one or more known patterns are represented by shared tnodes, each of said plurality of tnodes containing pattern information.

4. The computer controlled method of claim 3 wherein said direction list further comprises a second base leaf having a second tree of tnodes.

5. The computer controlled method of claim 1 wherein step (c) further comprises steps of:

(c1) gathering a plurality of tnode markers from said plurality of tnodes, each of said plurality of tnode markers associated with said one or more known patterns;

(c2) identifying a pattern termination tnode corresponding to a specific pattern of said one or more known patterns; and (c3) validating that said single traversal gathered required tnode markers associated with said specific pattern.

6. The computer controlled method of claim 1 wherein step (d) further comprises selecting a first pattern over a second pattern dependent on the number of tnodes represented by said first pattern and said second pattern.

7. The computer controlled method of claim 1 wherein said data structure is a directed acyclic graph (DAG), said starting node and said dependent nodes represent atomic image processing operations, said one or more known patterns representing molecular image processing operations.

8. An apparatus having a central processing unit (CPU) and a memory coupled to said CPU for searching a data structure in said memory to extract possible matches of one or more known patterns that may exist in said data structure, said apparatus comprises:

a data structure construction mechanism configured to build said data structure in said memory, said data structure having a starting node and one or more dependent nodes linked to said starting node;

a base-leaf matching mechanism configured to match said starting node of said data structure with a first base leaf contained within a direction list, said direction list comprising a plurality of tnodes one of which is said first base leaf, said direction list also representing said one or more known patterns each capable of being represented within said data structure, each of said one or more known patterns sharing said first base leaf within said direction list, the plurality of tnodes including a plurality of tnode markers;

a pattern search mechanism configured to search said data structure from said starting node for said one or more known patterns in said direction list by performing a single traversal of said direction list, said single traversal corresponding to said dependent nodes; and a pattern accumulation mechanism configured to accumulate one or more patterns dependent on the pattern search mechanism.

9. The apparatus of claim 8 further comprising a direction list construction mechanism configured to construct said direction list.

10. The apparatus of claim 9 wherein the direction list construction mechanism comprises:

a pattern identification mechanism configured to identify said one or more known patterns; and a direction list creation mechanism configured to create a first tree of tnodes, extending from said first base leaf, representing said one or more known patterns that start from said first base leaf, each of said on e or more known patterns represented by a respective interrelationship between said plurality of tnodes, wherein portions of said respective interrelationship that are shared between each of said one or more known patterns are represented by shared tnodes, each of said plurality of tnodes containing pattern information.

11. The apparatus of claim 10 wherein said direction list further comprises a second base leaf having a second tree of tnodes.

12. The apparatus of claim 8 wherein the pattern search mechanism further comprises:

a marker gathering mechanism configured to gather a plurality of tnode markers from said plurality of tnodes, each of said plurality of tnode markers associated with said one or more known patterns;

a termination tnode identification mechanism configured to identify a pattern termination tnode corresponding to a specific pattern of said one or more known patterns; and a pattern validation mechanism configured to validate that said single traversal gathered required tnode markers associated with said specific pattern.

13. The apparatus of claim 8 wherein the pattern accumulation mechanism further comprises a pattern selection mechanism configured to select a first pattern over a second pattern dependent on the number of tnodes represented by said first pattern and said second pattern.

14. The apparatus of claim 8 wherein said data structure is a directed acyclic graph (DAG), said starting node and said dependent nodes represent atomic image processing operations, said one or more known patterns representing molecular image processing operations.

15. A computer program product comprising:

a computer usable medium having computer readable code embodied therein for causing a computer to search a data structure in a memory to extract possible matches of one or more known patterns that may exist in said data structure, said computer readable code comprising:

computer readable program code configured to cause said computer to effect a data structure construction mechanism configured to build said data structure in said memory, said data structure having a starting node and one or more dependent nodes linked to said starting node;

computer readable program code configured to cause said computer to effect a base-leaf matching mechanism configured to match said starting node of said data structure with a first base leaf contained within a direction list, said direction list comprising a plurality of tnodes one of which is said first base leaf, said direction list also representing said one or more known patterns each capable of being represented within said data structure, each of said one or more known patterns sharing said first base leaf within said direction list, the plurality of tnodes including a plurality of tnode markers;

computer readable program code configured to cause said computer to effect a pattern search mechanism configured to search said data structure from said starting node for said one or more known patterns in said direction list by performing a single traversal of said direction list, said single traversal corresponding to said dependent nodes; and computer readable program code configured to cause said computer to effect a pattern accumulation mechanism configured to accumulate one or more patterns dependent on the pattern search mechanism.

16. The computer program product of claim 15 further comprising computer readable program code configured to cause said computer to effect a direction list construction mechanism configured to construct said direction list.

17. The computer program product of claim 16 wherein the direction list construction mechanism comprises:

computer readable program code configured to cause said computer to effect a pattern identification mechanism configured to identify said one or more known patterns; and computer readable program code configured to cause said computer to effect a direction list creation mechanism configured to create a first tree of tnodes, extending from said first base leaf, representing said one or more known patterns that start from said first base leaf, each of said one or more known patterns represented by a respective interrelationship between said plurality of tnodes, wherein portions of said respective interrelationship that are shared between each of said one or more known patterns are represented by shared tnodes, each of said plurality of tnodes containing pattern information.

18. The computer program product of claim 17 wherein said direction list further comprises a second base leaf having a second tree of tnodes.

19. The computer program product of claim 15 wherein the pattern search mechanism further comprises:

computer readable program code configured to cause said computer to effect a marker gathering mechanism configured to gather a plurality of tnode markers from said plurality of tnodes, each of said plurality of tnode markers associated with said one or more known patterns;

computer readable program code configured to cause said computer to effect a termination tnode identification mechanism configured to identify a pattern termination tnode corresponding to a specific pattern of said one or more known patterns; and computer readable program code configured to cause said computer to effect a pattern validation mechanism configured to validate that said single traversal gathered required tnode markers associated with said specific pattern.

20. The computer program product of claim 15 wherein the pattern accumulation mechanism further comprises computer readable program code configured to cause said computer to effect a pattern selection mechanism configured to select a first pattern over a second pattern dependent on the number of tnodes represented by said first pattern and said second pattern.

21. The computer program product of claim 15 wherein said data structure is a directed acyclic graph (DAG), said starting node and said dependent nodes represent atomic image processing operations, said one or more known patterns representing molecular image processing operations.

\* \* \* \* \*